Nov. 24, 1964 P. D. WURZBURGER 3,157,943
METHOD FOR FORMING CUTTER RINGS
Original Filed Feb. 11, 1959

INVENTOR.
PAUL D. WURZBURGER
BY
RICHEY, McNENNY & FARRINGTON.
Donald W. Farrington
ATTORNEYS United States Patent Office 3,157,943
Patented Nov. 24, 1964

3,157,943
METHOD FOR FORMING CUTTER RINGS
Paul D. Wurzburger, Cleveland Heights, Ohio, assignor to The Weatherhead Company, Cleveland, Ohio, a corporation of Ohio
Original application Feb. 11, 1959, Ser. No. 792,507, now Patent No. 3,092,405, dated June 4, 1963. Divided and this application Nov. 16, 1961, Ser. No. 152,761
2 Claims. (Cl. 29—541)

This invention relates to a novel and improved method and apparatus for forming cutting rings for the tube couplings disclosed in my co-pending application Serial No. 792,507, filed February 11, 1959, now Patent No. 3,092,405, issued June 4, 1963. The instant case is a division of my said application.

This invention relates to a method of manufacturing the cutting rings for tube couplings in which the gripping and sealing of the tube in the coupling is accomplished by cutting an annular groove in, and turning up an annular ridge on, the exterior of the coupled tube or pipe wherein the cutting is performed by cutting edges formed on axially extending teeth or serrations. For convenience of designation, tube couplings and pipe couplings will be referred to collectively as tube couplings.

Since the cutting ring of such tube couplings operates by cutting or shearing an annular groove into the tube, it is necessary to provide a cutting ring wherein the cutting edges are sufficiently hard to penetrate the material of the tube. It is often desirable to use the same material for the tube and cutting ring so that they will then have similar physical properties. A method and apparatus for forming a cutting ring incorporating this invention utilizes efficient and economical coining methods for forming the required teeth. With many metals including stainless steel, the work hardening occurring during the coining of the teeth results in a sufficient increase in the hardness of the material to eliminate any requirement of separate hardening or heat treating steps. However, even when separate hardening operations are required, the fact that the rings are locally work hardened permits the manufacture of rings wherein the remaining portions of the ring are not excessively hardened. This is due to the fact that the local work hardening permits lower levels of additional hardening to produce the necessary cutting edge hardness.

The cutting ring manufactured according to this invention is in the form of a tubular element having a through bore and formed with a plurality of cutting teeth. The edges of the cutting teeth constitute cutting edges which are deflected into the exterior surface of the tube when the coupling is used. As the cutting edges enter the surface of the tube, the tube material is cut and turned up to form a ridge for gripping and sealing. For a complete and detailed description of the operation of a cutting ring formed according to this invention, reference should be made to my co-pending application cited above.

A method incorporating this invention includes the steps of pressing a ring on which cutting teeth are to be formed against a hardened tool having complemental teeth formed therein so that the ring material is displaced and flows to form teeth on the ring. This operation accomplishes a dual purpose since the teeth are formed and the material of the teeth is work hardened. The ring is then processed through a second step wherein material is removed from the surface of the teeth to produce sharp cutting edges along their surface.

It is an important object to this invention to provide a novel and improved method of forming tooth cutting edges on a cutting ring for tube couplings.

It is another important object to this invention to provide a novel and improved method of forming axially extending hardened teeth on a cutting ring for tube couplings.

It is another important object to this invention to form a tube coupling cutting ring by the steps of pressing the end of the ring against a complemental toothed tool coining and flowing the material of the ring to form axially extending teeth thereon and thereby work hardening the material forming the teeth.

It is still another object of this invention to form tube coupling cutter rings by the steps of pressing the end of a tube against a complemental tool having forming teeth thereon thereby flowing ring material into a toothed shape and thereafter cutting away a portion of the tooth to form sharp cutting edges thereon.

It is still another object of this invention to form a tube coupling cutting ring by intermittently pressing portions of the ring against a toothed tool to intermittently flow the ring material into a toothed shape and progressively work harden the material of the teeth.

It is still another object of this invention to form a tube coupling cutter ring by pressing a surface of the ring intermittently against a tooth forming tool progressively flowing the ring material at such surface by a series of steps into a toothed shape, thus progressively work hardening such material, and thereafter cutting away a portion of the tooth formed thereby to form sharp cutting edges on the work hardened teeth.

It is still another object to this invention to provide an apparatus for forming tube coupling cutter rings by intermittently flowing portions of the ring material under a pressure produced by pressing the ring against a rotating tool having complemental teeth formed thereon, thus forming work hardened teeth in the material of the ring.

Further objects and advantages will appear from the following description and drawings wherein.

Figure 1:
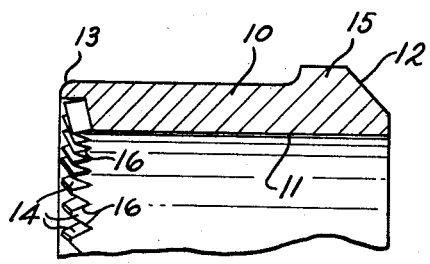
FIGURE 1 is a side elevation partially in longitudinal section illustrating one type of tube coupling cutting ring formed by a method and apparatus incorporating this invention.
Figure 2:
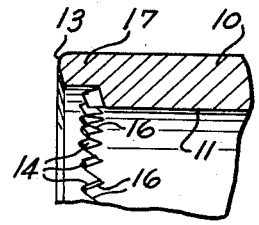
FIGURE 2 is a fragmentary section of a second type of cutting ring formed by a method and apparatus incorporating this invention.

Referring to the drawings, FIGURES 1 and 2 illustrate two different cutting ring forms which can be manufactured by a method and apparatus incorporating this invention. It should be understood, however, that these two ring forms are merely illustrations of ring types, shown to promote a better understanding of this invention and that many other tooth forms and cutter ring shapes can be produced. For a more complete and detailed description of a variety of tooth forms and ring shapes, reference should be made to the parent case of which this is a division.

The ring 10 of FIGURE 1 is formed with an axial bore 11 through which the tube to be sealed extends. The rearward end of the ring 10 is formed with a flange 15 having a rearward facing conical camming surface 12 adapted to be engaged by a complemental surface on a nut so that the ring can be forced forward in the coupling against a flaring mouth formed in the coupling body. The forward end of the ring 10 is formed with a radius 13 engageable with the previously mentioned mouth in the coupling body. Adjacent the forward end of the ring 10, a plurality of axially extending teeth 14 are formed which have sharpened cutting edges 16 along their inner surface. During the assembly of the coupling, the ring is moved by the nut forward into the mouth of the body which radially deflects the forward end of the ring inward so that the cutting edges 16 cut into the outer surface of the tube providing a grip and seal thereon. In the ring 10, of FIGURE 1, the teeth 14 are formed immediately adjacent the forward end of the ring.

FIGURE 2 illustrates a second form of ring wherein the teeth 14 are located at a point rearwardly spaced from the forward end of the ring. In this form of ring the forward radius 13 is formed on an overhanging portion 17 which extends forwardly from the tooth zone. In the manufacture of this ring form, the end of the ring is counter-bored before the formation of the teeth to provide the overhanging portion 17.

Figure 3:
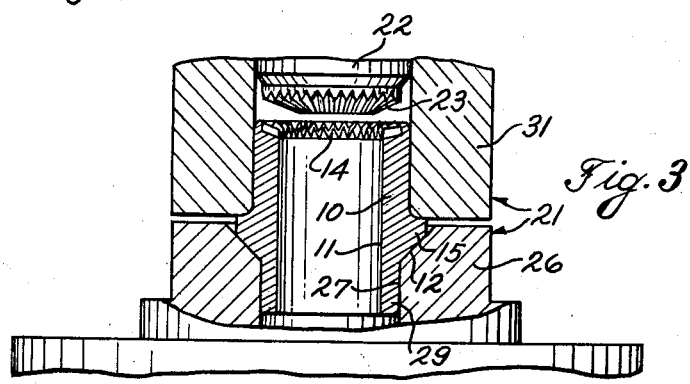
FIGURE 3 is a side elevation in longitudinal section illustrating an apparatus for forming axially extending teeth in a cutter ring by pressing the ring against a tool having complemental teeth formed therein.

In FIGURE 3 a first embodiment of a method and apparatus incorporating this invention is illustrated. The cutting ring 10 is supported in a fixture 21 in a press wherein an axially moving die or tool 22 having the male form of teeth 23 of the female serrations and tooth profiles of the serrated cutting teeth 14, is forceably pressed against the forward end of the cutting ring 10 to coin or upset the ring and form the teeth directly in the end face of the cutting ring.

Before placing the cutting ring 10 in the fixture 21, the end face of the cutting ring is machined to appropriate form to receive the impact and impression of the tool 22. The coining or working of the end of the cutting ring 10 tends to displace metal radially inwardly into the smooth cylindrical bore 11 adjacent the newly formed teeth. Therefore, for a second operation, I ream out the radially inward ends of the teeth and serrations 14 with a reamer or boring tool 24, illustrated in FIGURE 5, to re-establish the true cylindrical form of the bore 11 adjacent the teeth. This accomplishes the dual function of reestablishing the smooth bore 11 and sharpening the inner edges of the teeth to form the required sharp cutting edges 16.

The fixture 21 includes a base part 26 positioned on the work table of the press. The base part is formed with complemental surfaces 27 proportioned to receive and support the rearward end of the ring 10 including the camming surface 12 formed on a camming flange 15. In the ring illustrated in FIGURE 3, a guiding section 29 extends rearwardly from the camming surface 12 so the base part 26 of the fixture 21 is formed with a bore to closely receive this section. The fixture 21 is preferably provided with a movable sleeve 31 which closely fits over the periphery of the upper portion of the ring 10 and seats against the forward side of the flange 15. This sleeve may be supported on the ram of the press for limited sliding movement relative to the tool 22 so that it moves into the illustrated position before the tool engages the forward face of the ring 10. Continued movement of the ram of the press carries the tool 22 down into engagement with the forward end of the ring while the sleeve 31 remains stationary in the position illustrated.

The tool 22 is pressed by the ram down into the forward end of the ring coining the metal thereof and causing it to flow, thus forming the required teeth 14. The teeth 23 on the tool 22 must be shaped to form the desired tooth shape on the ring 10. The coining operation used to form the teeth 14 on the ring results in substantial work hardening of the material of the ring in the teeth 14 so that the resulting teeth have sufficient hardness to cut into a tube formed of similar non-worked hardened material.

Figure 5:
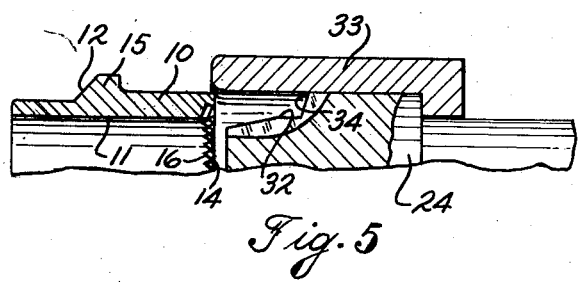
FIGURE 5 is a side elevation of one form of cutting tool used to sharpen the teeth formed on the ring.

After the teeth are coined, as illustrated in FIGURE 3, the ring is transferred to the next process step illustrated in FIGURE 5. The boring tool 24 is formed with cutting edges 32 having a diameter equal to the diameter of the through bore 11 and a guiding sleeve 33 which fits over the periphery of the forward end of the ring to assure exact alignment during the boring operation. By producing relative rotation between the boring tool 24 and the ring as the two parts are fed together, the inner surface of the teeth 14 is machined away to re-establish the smooth bore 11 and simultaneously sharpen the teeth 14 to form the sharp cutting edges 16. If it is desired to form blunt edges on the teeth 14, the boring tool 24 is provided with a radially extending cutting portion 34 which cuts off the ends of the teeth.

Figure 4:
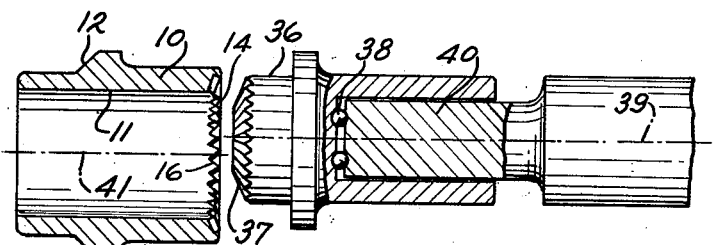
FIGURE 4 is a side elevation in longitudinal section of a second form of apparatus incorporating this invention wherein the tool and ring are rotated as the tool and ring are pressed together to produce intermittent pressure therebetween.

In FIGURE 4 another form of the method and apparatus incorporating this invention is illustrated. In this embodiment the ring 10 is pressed against a tool 36 while both the ring and tool are rotated. The tool 36 is formed with hardened teeth 37 which are complemental to the teeth to be formed in the ring thereby. The tool, however, is constructed so that it has a smaller diameter than the toothed portion of the ring 10. Therefore, the number of teeth formed on the tool 36 is different than the number of teeth formed on the ring but the teeth have the same spacing. Bearings 38 journal the tool 36 on a tool stock 40 so that it can rotate about its axis 39. When this embodiment is utilized, both the ring 10 and tool 36 are mounted for rotation about their respective axes and power means are connected to rotate one or the other. The unpowered part is then rotated by virtue of the engagement with the powered part. It is customary to support the ring 10 in the spindle of a machine such as an automatic screw machine and journal the tool 36 on the turret.

The axis 39 of the tool 36 is displaced from the axis of rotation 41 of the ring so that only a portion of the ring 10 is engaged by the tool at any instant. The axes 39 and 41 are parallel and displaced in the illustrated embodiment so that the engagement occurs in the upper zone as viewed in FIGURE 4.

The engagement between the rotating ring 10 and the tool 36 causes the tool to rotate and intermittently work the entire tooth portion of the ring 10. Thus, the tool 36 and ring 10 are pressed together while both rotate and the tool progresses around the tooth zone of the ring 10, but engages only a small portion at any given moment. Since only a small portion of the ring 10 is being coined or worked at a given time, smaller forces are necessary to create coining actions. Also, the intermittent working of the material of the ring results in greater hardness since intermittent working or coining operations achieves the higher degrees of work hardening in most metals. After the teeth are coined on the ring, the tool 24 of FIGURE 5 is used to sharpen the teeth and re-establish the bore 11 by removing metal displaced inward by the coining.

I have found it practical to employ this method of making teeth in brass, steel, and stainless steel cutting ring elements and have found the work hardening of making the teeth by this method in many materials is sufficient to make the cutting points and edges of the teeth sufficiently harder than the tubes or pipes of the same material to give the desired and characteristic mode of operation with cutting and penetration and digging of the tube by the cutting ring. This method permits the rapid economical and accurate formation of the axially extending teeth on the cutting ring 10 and often eliminates the need of separate heat treating or other means of hardening the cutting edges. Thus, the manufacturing costs of the cutting rings is greately reduced since machining operations are not required to form the teeth and hardening of the tooth material and cutting edges is achieved simultaneously with the formation of the teeth.

Although preferred embodiments of this invention are illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

What is claimed is:

1. A method of forming cutter rings for tube couplings with teeth having cutting edges comprising the steps of forming a metal ring with a bore and a smooth face adjacent thereto from metal which work hardens, pressing said face against a tool having complemental teeth formed therein coining the metal of said ring at the radially inner portion of said face and plastically flowing such metal to form work hardened teeth while leaving the radially outer portion of said face unworked, and thereafter cutting away metal displaced radially inward within said bore by such flowing thereby forming sharp axially facing cutting edges on said teeth.

2. A method of forming cutter teeth on a tube coupling cutter ring comprising forming a ring with a bore and an annular face extending radially therefrom, pressing a radially inner portion of said face against a tool having complemental teeth thereon while moving said tool and ring relative to each other to cause the portion of contact therebetween to repeatedly move around said face thereby progressively and intermittently coining teeth on the radially inner portion of said ring and work hardening the material of such teeth while leaving the radially outer portion of said annular face unworked, and thereafter cutting away material displaced into said bore forming sharp axially facing cutting edges on said teeth.

References Cited in the file of this patent

UNITED STATES PATENTS

| | | |
|---|---|---|
| 338,961 | Hart | Mar. 30, 1886 |
| 935,636 | Brun | Oct. 5, 1909 |
| 1,096,009 | Ayres | May 12, 1914 |
| 1,305,050 | Beall | May 27, 1919 |
| 1,888,343 | Bohlman et al. | Nov. 22, 1932 |
| 1,890,452 | Benminghoff | Dec. 13, 1932 |
| 2,474,178 | Wurzburger | June 21, 1949 |
| 2,833,569 | Budnick | May 6, 1958 |
| 3,097,870 | Zeller | July 16, 1963 |

FOREIGN PATENTS

| | | |
|---|---|---|
| 617,048 | Great Britain | Jan. 31, 1949 |